F. TAYLOR.
RESILIENT WHEEL.
APPLICATION FILED DEC. 11, 1916.

1,240,624.

Patented Sept. 18, 1917.

Inventor
Frank Taylor.

By

Atty.

UNITED STATES PATENT OFFICE.

FRANK TAYLOR, OF PONSONBY, AUCKLAND, NEW ZEALAND.

RESILIENT WHEEL.

1,240,624.  Specification of Letters Patent.  Patented Sept. 18, 1917.

Application filed December 11, 1916. Serial No. 136,261.

*To all whom it may concern:*

Be it known that I, FRANK TAYLOR, a citizen of the Dominion of New Zealand, and residing at Brown street, Ponsonby, Auckland, in the provincial district of Auckland in the Dominion of New Zealand, have invented certain new and useful Improved Resilient Wheels of which the following is a specification.

This invention relates to that class of wheels the centers of which are resiliently supported, and provides a wheel wherein spiral springs are interposed between the wheel-center and the tire for absorbing ordinary shocks, and rubber blocks to assist the spiral springs in absorbing abnormal shocks.

The invention comprises the arrangement of the springs, and the means set forth for combining the action of the spiral springs, or the action of the spiral springs with the rubber blocks.

The drawing herewith illustrates the invention and will now be referred to for the purpose of particularly setting forth the invention.

Figure 1:
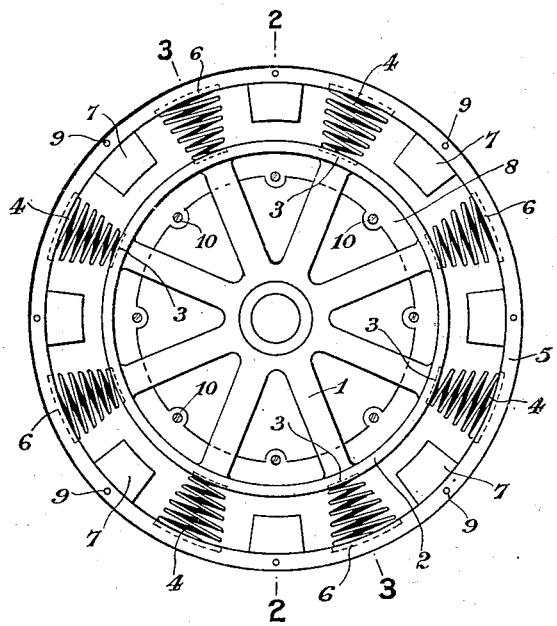
Figure 1, is an elevation of the wheel with a flange plate removed.
Figure 2:
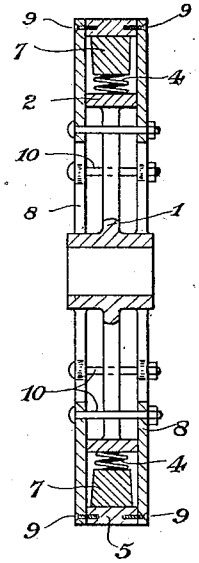
Fig. 2, is a cross section on line 2—2, Fig. 1.
Figure 4:
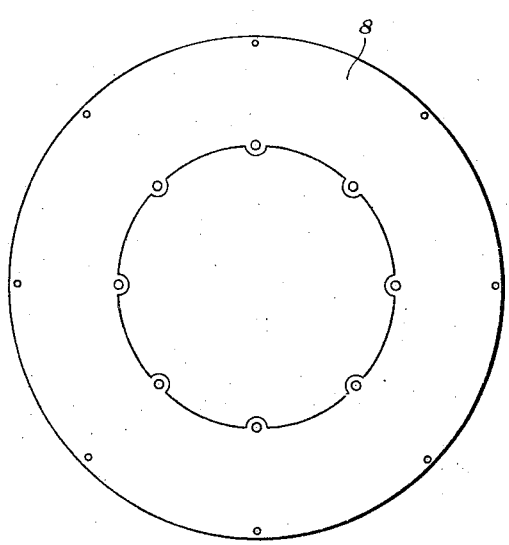
Fig. 4, is an elevation of a flange plate.
Figure 3:
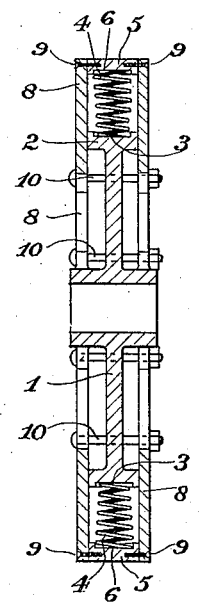
Fig. 3, is a cross section on line 3—3, Fig. 1.

The wheel-center 1 has a rim 2 wherein are formed recesses 3 to receive the inner ends of spiral springs 4, which are oval in plan and smaller in diameter at their inner ends than at their outer ends. The oval shape provides a large base within the narrow limits of the width of a wheel tire.

The tire 5 surrounds the springs 4 and is provided with recesses 6 for receiving the outer ends of the springs 4. The tire is provided with blocks of rubber 7, which are less in radial length than the normal distance between the tire 5 and the rim 2, and alternate with the spiral springs 4.

Flanges consisting of annular plates 8 are fixed to the tire 5 by screws, rivets or the like 9, and are also held by bolts 10, which pass through the plates 8 and inside the rim 2. These bolts 10 keep the flanges close to the rim 2, and limit the movement of the said rim within the plates 8.

What I do claim and desire to secure by Letters Patent of the United States is:—

In a resilient wheel, the combination with an inner rim formed on its periphery with spaced oval shaped depressions, of an outer rim spaced from the inner rim and provided on its inner surface with a plurality of oval shaped depressions in line with and larger than the oval shaped depressions in the inner rim, oval shaped coil springs having their ends seated in the depressions, the coils of the springs being larger at the outer ends than those at the inner ends, rubber cushioning blocks secured to the inner surface of the outer rim between each of the springs and normally spaced from the inner rim and adapted to contact with the periphery of said rim when load strain is applied to the wheel, and circular plates secured to the outer rim and overlapping the inner rim to inclose the springs and the rubber blocks.

In testimony whereof I have signed my name to this specification in the presence of two witnesses.

FRANK TAYLOR.

Witnesses:
 T. A. McCONNELL,
 EILEEN ATTRIDGE.

Copies of this patent may be obtained for five cents each, by addressing the "Commissioner of Patents, Washington, D. C."